(12) United States Patent
Christian et al.

(10) Patent No.: US 7,409,422 B2
(45) Date of Patent: Aug. 5, 2008

(54) DECLARATIVE PAGE VIEW AND CLICK TRACKING SYSTEMS AND METHODS

(75) Inventors: Brian S. Christian, Sammamish, WA (US); Devatta Waghdhare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 10/645,224

(22) Filed: Aug. 21, 2003

(65) Prior Publication Data

US 2005/0044139 A1    Feb. 24, 2005

(51) Int. Cl.
G06F 15/16    (2006.01)
G06F 15/173    (2006.01)

(52) U.S. Cl. .................. 709/203; 709/224; 709/232; 709/238; 709/239; 709/246; 725/22; 707/10; 707/101; 707/200

(58) Field of Classification Search ............. 709/202, 709/203, 224
See application file for complete search history.

(56) References Cited

U.S. PATENT DOCUMENTS

| | | | | |
|---|---|---|---|---|
| 5,708,780 A * | 1/1998 | Levergood et al. | ........... | 709/229 |
| 5,796,952 A * | 8/1998 | Davis et al. | ............. | 709/224 |
| 5,968,125 A * | 10/1999 | Garrick et al. | ............. | 709/224 |
| 6,240,455 B1 * | 5/2001 | Kamasaka et al. | ......... | 709/229 |
| 6,735,739 B1 * | 5/2004 | Healey | ................ | 715/205 |
| 6,886,014 B1 * | 4/2005 | Dasgupta | ............. | 709/217 |
| 6,925,442 B1 * | 8/2005 | Shapira et al. | ........... | 709/224 |
| 6,954,901 B1 * | 10/2005 | Desai et al. | ............. | 715/745 |
| 7,000,242 B1 * | 2/2006 | Haber | ................ | 725/43 |
| 2002/0078191 A1 * | 6/2002 | Lorenz | ................ | 709/223 |
| 2002/0165955 A1 * | 11/2002 | Johnson et al. | ........... | 709/224 |
| 2003/0177226 A1 * | 9/2003 | Garg et al. | ............. | 709/224 |
| 2003/0187976 A1 * | 10/2003 | Decime | ............... | 709/224 |
| 2004/0215715 A1 * | 10/2004 | Ehrich et al. | ........... | 709/203 |

OTHER PUBLICATIONS

Mogul, Jeffrey C., The Case for Persistent-Connection HTTP, 1995, ACM Press, p. 299-313.*
Blundo, Carlo et al. "SAWM: A Tool for Secure and Authenticated Web Metering." Proceedings of the 14th International Conference on Software Engineering and Knowledge Engineering SEKE '02. ACM Press. Jul. 2002. 641-48.*
Joshi, Karuna et al. "Warehousing and Mining Web Logs." Proceedings of the 2nd International Workshop on Web Information and Data Management WIDM '99. Nov. 1999. ACM Press. 63-68.*
Eirinaki, Magdalini et al. "Web Mining for Web Personalization." ACM Transactions on Internet Technology. vol. 3, No. 1. Feb. 2003. ACM Press. 1-27.*

* cited by examiner

Primary Examiner—Jason Cardone
Assistant Examiner—Jeffrey R Swearingen

(57) ABSTRACT

Declarative page view and click tracking systems and methods are described. To utilize page view and/or click tracking, a web page developer includes a link identifier in a function call or build anchor tag call of a web page. A tracking server identifies links that include the link identifier and replaces the links with modified links that include a tracking identifier for use with a tracking system. When a modified link is selected, tracking is initiated for the link. If the tracking cannot be initiated within a specified timeout period, a client is redirected to the site identified in the link without waiting for the tracking to occur.

26 Claims, 4 Drawing Sheets

500

DECLARATIVE PAGE VIEW AND CLICK TRACKING SYSTEMS AND METHODS

TECHNICAL FIELD

The systems and methods described herein relate to tracking network client behavior. More particularly, the systems and methods described herein relate to page view and click tracking systems and methods that utilize declarative means initiate tracking.

BACKGROUND

In an effort to provide more useful services, content and user experience on a network site, such as an Internet site, web page developers study how users make use of web pages on a particular web site. One way to understand the usefulness of particular features of a web page are to track what features are frequently clicked on by users and what features are rarely clicked on by users. In addition, keeping track of pages and portions of pages viewed by users may also provide useful information to developers and others.

To undertake such study, user patterns are tracked by keeping logs of all the clicks and page views on a web page. To utilize a click tracking system, each link contained in a web page has a particular set of click code that is produced based on the type of the link and the content to which a link references. When a link is clicked, a client (i.e., user computer) is first directed to a tracking server where the click information gets logged. Thereafter, the client is redirected to a destination specified in the link. User patterns are derived from statistics generated from log files on the tracking server.

Each link has an associated script (typically JavaScript) function that details the click code, destination address, etc. Each link script may also have parameters to define if the link is a link to a page on an internal site or an external site. Each link also may be programmed to behave differently depending on if the link is a link to a web page or a link to media content. Furthermore, the link script may depend on various external files for redirection code.

All this requires a significant amount of code to be manually included in every file to generate an appropriate click tracking element for a particular click tracking system. This also tends to create an undesirable amount of external dependencies. Unfortunately, the tedious nature of providing unique click code for each link in a web page necessarily creates a lot of room for errors by page developers. To avoid these problems, a standardized, declarative solution is desirable that would provide a more convenient and efficient way for page developers to provide certain functionality (such as click tracking and/or page view tracking) to their web pages.

SUMMARY

Declarative page view and click tracking systems and methods are described. The present description is related to a click tracking/page view tracking system, although the described techniques may be used in other systems for other purposes. To initiate click tracking within a web page, a page developer must only include a link identifier in a parameterized link, which is HTML (HyperText Markup Language) compliant. One or more custom function calls (or build anchor tag calls) are defined herein that can be used inside of a link element or an anchor tag to have the link participate in a tracking system. As a result, page developers do not have to customize click code for each unique link.

When a selectable link is clicked on by a client, the link identifier triggers a click tracking system to initiate click tracking for that particular link. The click tracking system replaces the link with a modified link automatically built to system specifications. The click on the link is then logged by a tracking server and the client is redirected to a destination specified in the link. If the click cannot be logged within a specified timeout period, then the link is redirected to its destination without logging the click to avoid an unsatisfactory user experience.

The techniques described herein are "declarative" in that the functional aspects of the techniques are performed outside individual page code, and that there is only a single function call for all of the different kinds of links that may be used on a web page. External dependencies and individual code related to each link contained in the web page are eliminated. In addition, the code required to implement click tracking and handling is transparent to a page developer. This significantly eases the burden of providing certain functionality (such as click tracking) to each link that is included in a web page.

BRIEF DESCRIPTION OF THE DRAWINGS

The same numbers are used throughout the document to reference like components and/or features.

DETAILED DESCRIPTION

The following depictions describe one or more exemplary systems and/or methods for declarative page view and click tracking. The examples described are but a few examples of various manners in which the subject matter of the appended claims may be implemented. The described examples are not intended to limit the scope of the appended claims in any manner, but are shown to accurately describe the best mode of carrying out the invention delineated by the claims.

The examples described below relate to ASP.NET technology, but may be implemented in one or more other types of web services framework. ASP (Active Server Pages) is a server-side scripting technique promulgated by MICROSOFT CORP® that enables server execution of scripts embedded in web pages. ASP is included in the WINDOWS® family of operating systems.

An ASP file (a file having an asp extension) may contain HTML, text, XML and/or one or more scripts. Scripts in the ASP file are executed by a server. When a client web browser requests an HTML file from a server, the server merely returns the requested HTML file. When a client web browser requests an ASP file from a server, an Internet Information Server (IIS) in the server passes the request to an ASP module. An ASP engine reads the file, line by line, and executes the scripts in the file. The ASP file is then returned to the client web browser as a plain HTML file.

Although the present examples will focus on ASP technology, it is noted that the examples may be implemented with any other form of web services scripting technology without departing from the scope of the claimed systems and methods.

The systems and methods described below relate to a web page development framework within which page developers can utilize a parameterized link element to provide click tracking for a link on a web page instead of associating unique code with each link that executes upon selection of the link by a user. The information collected and transmitted to an external system (such as, in the present case, a tracking server) is provided in parameters associated with the element. The element parameters are used to automatically generate a URL (Universal Resource Locator) that is properly constructed to provide an advanced click tracking function with the link.

Exemplary Network Environment

Figure 1:
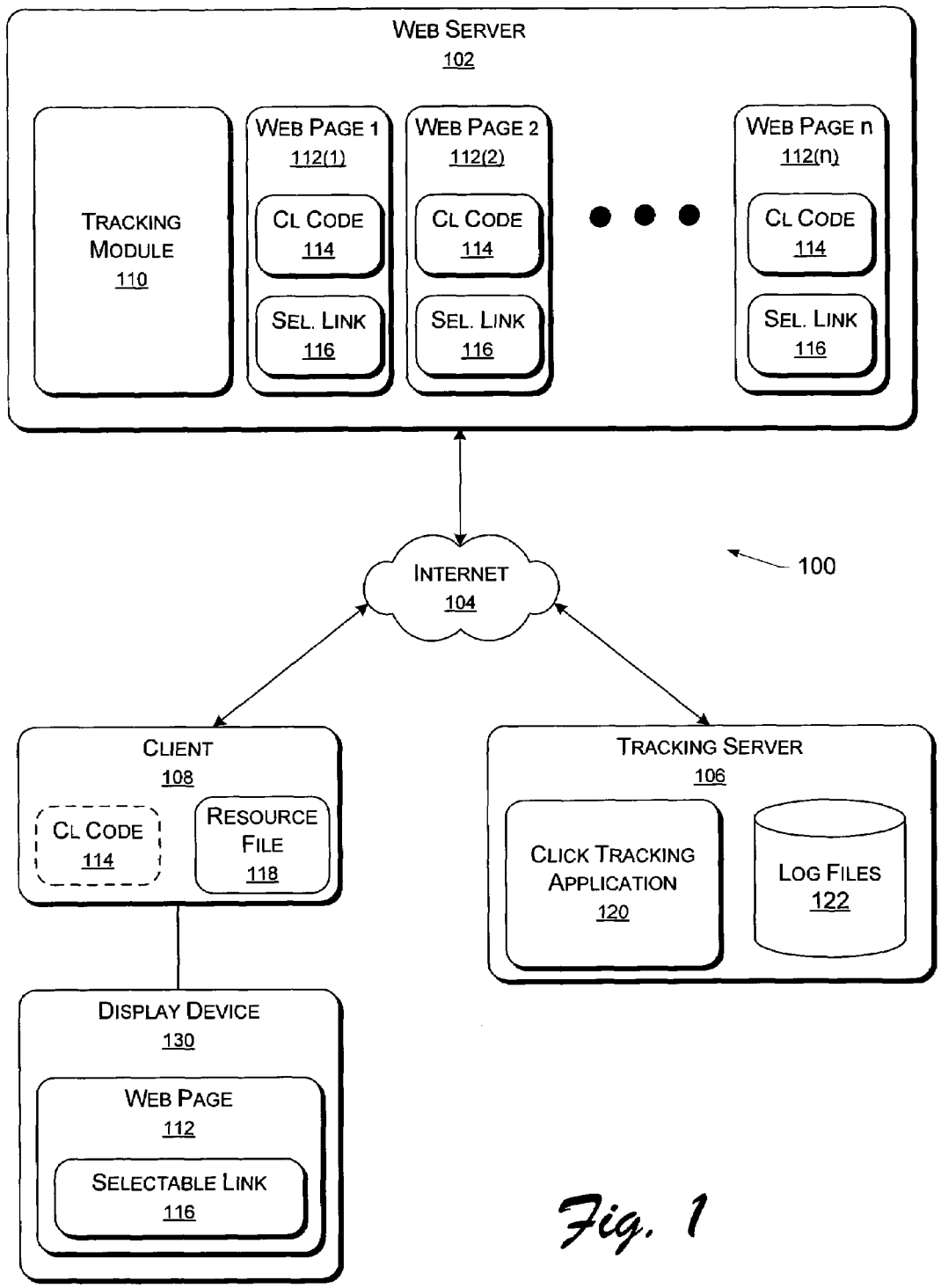
FIG. 1 is a block diagram illustrating an exemplary network environment.

FIG. 1 is a block diagram that illustrates an exemplary network environment 100. The exemplary network environment 100 includes a web server 102 that communicates over the Internet 104 with a tracking server 106 and a client computer 108 (hereinafter "client 108"). The web server 102 provides web content to the client 108 as well as multiple other clients (not shown).

The web server 102 includes a tracking module 110 and several web pages 112(1)-112(n). The tracking module 110 includes client code 114 that is injected into the web pages 112 under certain conditions. For exemplary purposes, each web page 112 is shown having the client code 114 included therein. However, as will be described in greater detail below, the client code 114 is not necessarily originally included in the web page 112 but may have the client code 114 injected into it by the tracking module 110. Each particular web page 112(1)-112(n) includes at least one selectable link 116(1)-116(n), respectively.

The tracking server 106 includes a click tracking application 120 that is configured to track page clicks and, in some implementations, page views. The tracking server 106 also includes a log files database 122 that stores information obtained by the click tracking application 120.

The client 108 includes a resource file 118 that stores script functions used in a tracking process. During tracking operations, the resource file 118 contents are stored on the client 108 by the tracking module 110. The client 108 may also include the client code 114 if an implementation is such that the client code 114 is downloaded to the client 108 by the web server 102. However, the implementations described herein do not entail downloading the client code 114 to the client 108.

The client 108 communicates with a display device 130 that has the ability to display one or more of the web pages 112 (or other web pages, not shown). The selectable link 116 of a particular web page 112 is selectable on the display device.

The functions of the elements shown in FIG. 1 will be discussed in greater detail below, with respect to the following figures.

Exemplary Selectable Link

Figure 2:
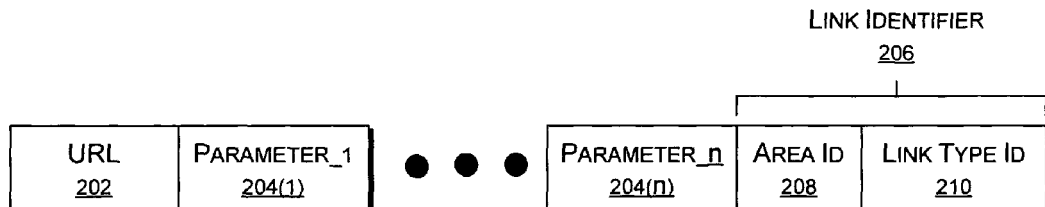
FIG. 2 is a representation of a selectable link that may be included in a web page.

FIG. 2 is an illustration of a selectable link 200—similar to the selectable links 116 shown in FIG. 1—that may be included in a web page. The selectable link 200 is shown in its original unmodified form, similar to what would be included in a web page by a web developer. The selectable link 200 is an HTML compliant link element.

The selectable link 200 includes a label 201 and a URL 202 that a client computer is directed to when a client computer user selects the selectable link 200. The label 201 may be a function call or a build anchor tag call name that initiates the link. For convenience, any further reference to a function call may also denote a build anchor tag call. The selectable link 200 also includes one or more parameters 204(1)-204(n). The URL 202 and the one or more parameters 204 are typical of those included in an HTML-compliant link.

An example of the label 201 that is utilized in MICROSOFT® WINDOWS® family of operating systems is GetHrefText (in the case of a link function call), or BuildAnchorTag (in the case of a build anchor tag call). These labels are exemplary only and may vary in different systems and/or implementations.

Examples of the parameters 204 can include internallink, stream, linkid, objectid, windowparams and onclickscript. Therefore, a function call may be represented as:

<a GetHrefText(url, internallink, stream, linkid, objectid, onclickscript)>link </a>

Note that the windowparams parameter may also be included in the event that a link opens a popup window.

Similarly, a build anchor tag call in a WINDOWS®-based system may be represented as:

BuildAnchorTag(url, internallink, stream, linkid, objectid, onclickscript, linktext).

It is also noted that the functionality described above may also be implemented inside ASP.NET user controls. Therefore, developers don't have to implement the Page Base Class inside custom user controls. The syntax for doing so is:

public static string GetHrefText( ... ) and
public static string BuildAnchorTag( ... ).

The selectable link 200 also includes a link identifier 206. The link identifier 206 is assigned by a web page developer who develops the web page that includes the selectable link 200. As will be discussed in greater detail below, the link identifier 206 may be maintained or modified by a click tracking system.

Web page developers follow a fixed pattern to develop the link identifier 206 for a web page that runs under particular system. The fixed pattern may differ between different systems. The web page developer derives the link identifier 206 by following the fixed pattern, then includes the link identifier 206 in a link of a web page. If the fixed pattern is followed to derive the link identifier 206, then the link identifier 206 will probably remain the same when the link is modified to include a tracking identifier (see below). If, however, the link identifier 206 does not conform to system specifications, the system may change the link identifier 206 during tracking processing.

In at least one implementation, the link identifier 206 is divided into two parts, to-wit: an area identifier 208 (i.e., the section of a web page where the link is located), and a link type identifier 210. For example, if the link is inside a third feature on the web page, the area identifier 208 is F2. If the link is a link on a first sub-feature, then the area identifier 208 is S0.

The link type identifier 210 is the type of link followed by a count of that link inside the area in which it is located. For example, if the link is a third text link, the link type identifier 210 is T2. If the link is a first graphic link in a particular area, the link type identifier 210 is G0.

The area identifier 208 and the link type identifier 210 are combined to form the link identifier 206. In the above examples, the link identifiers 206 that would result from the exemplary area identifiers 208 and link type identifiers 210 are F2T1 and S0G0, respectively.

As will be discussed below, the link identifier 204 identifies the selectable link 200 to a click tracking system (tracking module 110, FIG. 1) as a link that should be tracked. Inclusion of the link identifier 204 in the selectable link 200 does not affect the HTML-compliant status of the selectable link 200.

The inclusion of the link identifier 200 is the declaration made in the web page that keeps the selectable link 200 from having to have unique click code associated with it. The tracking module 110 identifies the selectable link 200 as one that should be tracked and—by virtue of the inclusion of the link identifier 204—performs click tracking on the selectable link 200 if and when the link 200 is selected.

Exemplary Tracking Identifier

Figure 3:
FIG. 3 is a representation of a tracking identifier as described herein.

FIG. 3 illustrates an exemplary tracking identifier 300 that is substituted into the selectable link (200, FIG. 2) by a tracking system (e.g. tracking module 110, FIG. 1). The tracking identifier 300 includes a container identifier 302 that uniquely identifies a container (not shown) that contains the selectable link 200 (for instance, if the selectable link 200 is a link inside a specific group of links).

The tracking identifier 300 also includes a link index 304 that is an index of the selectable link 200 inside the container that is identified by the container identifier 302. The link index 304 denotes a link's position relative to other links within the same container. For example, if the selectable link is the second link in the specified container, the selectable link 200 may have a link index of "2", "L2" or the like, depending on the particular implementation.

The tracking identifier 300 also includes a link identifier 306 that may or may not be the same as the link identifier 206 (FIG. 2) that is assigned by the page developer. The particular implementation of the tracking module 110 determines the derivation of the link identifier 306. If a particular implementation of tracking module 110 does not utilize the original link identifier 206, then the original link identifier 206 is replaced with a modified link identifier 306 generated by the tracking module 110.

Exemplary Modified Selectable Link

Figure 4:
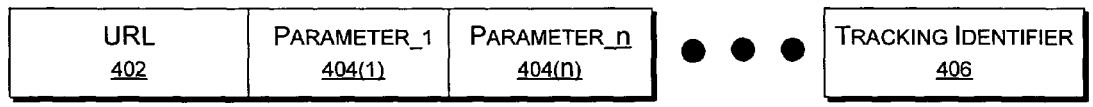
FIG. 4 is a representation of a tracking system modified selectable link as described herein.

FIG. 4 illustrates an exemplary selectable link 400 that has been modified by the tracking module 110, FIG. 1. In the present example, the selectable link 400 shown in FIG. 4 is the same as the selectable link 200 shown in FIG. 2, except that the link identifier 206 included in the selectable link 200 of FIG. 2 has been replaced in FIG. 4 by a tracking identifier 406 that is similar to the tracking identifier 306 shown and described in FIG. 3. The modified selectable link 400 also includes a URL 402 and one or more parameters 404(1)-404(n).

When the tracking application 110 identifies the selectable link 200 as being configured to invoke click tracking (or page view tracking, or both), then the tracking application 110 removes the selectable link 200, transforms the selectable link 200 into the modified selectable link 400 and inserts the modified selectable link 400 into the web page. As will be discussed in greater detail, below, the tracking module 110 then logs the selection of the link 200/400 and redirects the selector to a web page identified by the URL 202/402 included in the link 200/400.

Exemplary Methodological Implementation

Figure 5:
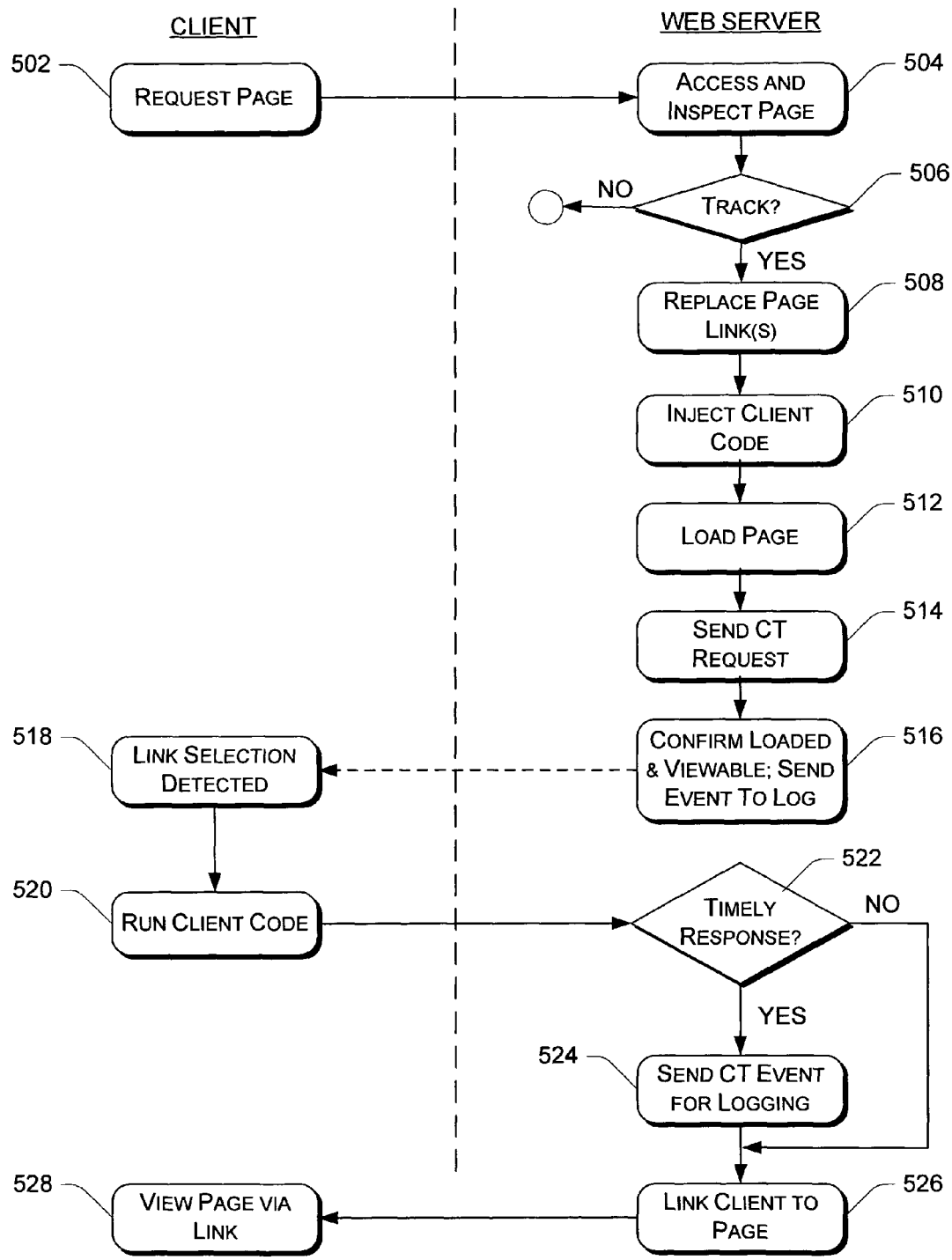
FIG. 5 is a flow diagram depicting a methodological implementation of a page view click tracking system.

FIG. 5 is a flow diagram 500 depicting a methodological implementation of a page view click tracking system. The flow diagram 500 depicts activities that occur in the web server 102 and the client 108 and is divided accordingly. In the following discussion, continuing reference will be made to previous figures and the elements contained therein.

At block 502, the client computer 108 requests a web page 112(1) from the web server 102 by clicking on the selectable link 116(1) of the web page 112(1). The web server 102—more particularly, the tracking module 110—accesses the web page 112(1) and inspects the selectable link 116(1), and any others that may be included in the web page 112(1), at block 504.

At this point, the tracking module 110 may also be configured to inspect the client 108 to determine if the client 108 is of a configuration that is desirable to track. The parameters for this determination may be configured for each particular implementation of the tracking module 110. For example, the tracking module 110 may be configured to track clicks and page views only for client computers that run a certain version of web browser, such as INTERNET EXPLORER® 5.0 or higher. Or tracking may only be desirable for client computers having certain hardware configurations.

If the tracking module 110 determines that the client 108 is not one that is desirable to track ("No" branch, block 506), then the process terminates. If the tracking module 110 determines that the client 108 is suitable for tracking ("Yes" branch, block 506), then the tracking module 110 replaces the selectable link 116(1) with a modified selectable link (similar to the modified selectable link 400 shown in FIG. 4) at block 508.

Replacing the original selectable link 116(1) provides the web server 102 with an opportunity to place the link into an appropriate condition for use with the tracking application 110. For instance, the tracking identifier (300, FIG. 3) is added to the selectable link 116(1) so that the tracking module 110 and/or the click tracking application 120 can properly record the selection of the selectable link 116(1). Also, if the selectable link 116(1) contains some minor errors, the tracking application 110 may be able to remedy those errors at this point. Such errors may include an incorrect URL designation or the like.

At block 510, the tracking application 110 injects the client code 114 into the web page 112(1). By injecting the client code 114 into the web page 112(1), the tracking module 110 provides the client 108 with code that may be required to properly work with the click tracking application 120. In one or more alternative implementations, the client code 114 could be downloaded to the client 108, but this may not be desirable in many cases.

The configuration of the client code 114 depends on a client-side scripting. The client code 114 depends on different script functions which are stored in the resource file 118 on the client 108 so that a page developer does not need to include the script files in every project.

Based on values included in the link parameters, the tracking module 110 emits appropriate script code to the client 108 which is used by the click tracking application 120.

In one particular implementation (WINDOWS®), a value "wmis.page.track=42" causes javascript functions supporting click tracking to be emitted. A value "wmis.page.track=42" emits code to redirect to an external partner and to simulate an external click so that external partners can identify the entity that referred the user to the partner site. A value "wmis.page.clickback=42" emits a function that completes the link after receiving a response from the tracking server 106.

It is noted that the above examples are configured for use with WINDOWS® compatible applications. Other client code may be used with the present technique with other application, programs, systems, etc. as may be desired for any particular implementation.

At block 512, the requested web page 112(1) is loaded for the client 108. The tracking module 110 confirms that the web page 112(1) properly loads and is viewable at the client 108 and, if so, sends a page view event to the tracking server 106 where the click tracking application 120 records the event in the log files 122.

When the selectable link 116(1) is clicked at the client 108 (block 518), the client code 114 begins execution at block 520. At this point, the client code 114 could send a click tracking event to the tracking server 106. However, in the described implementation, the client code 114 first determines the viability of the tracking server 106 at block 522. This may be accomplished in one of various implementations.

In at least one implementation, the client code initiates an HTTP (HyperText Transfer Protocol) request to occur, namely, a blank page to load at the tracking server 106. If the page load is confirmed within a predefined timeout period ("Yes" branch, block 522), then the response is timely and a click tracking event is sent to the tracking server 106 at block 524.

If the page load cannot be confirmed within the timeout period ("No" branch, block 522), then the tracking procedure is skipped. This way, a client user is not inconvenienced by having to wait a significant amount of time for the link to occur. Also, it helps to prevent a denial of service attack on the tracking server 106 that may be caused by submitting numerous requests to the tracking server 106 that are never timed out.

In at least one implementation, the predefined timeout period is one and one-half (1½) seconds. However, the timeout period may be configured as desired in any particular implementation.

The client 108 is then linked to a web page identified as the destination in the selectable link 116(1) at block 526 and the client 108 can view the web page identified as the destination in the selectable link 116(1) at block 528.

Exemplary Operating Environment

Figure 6:
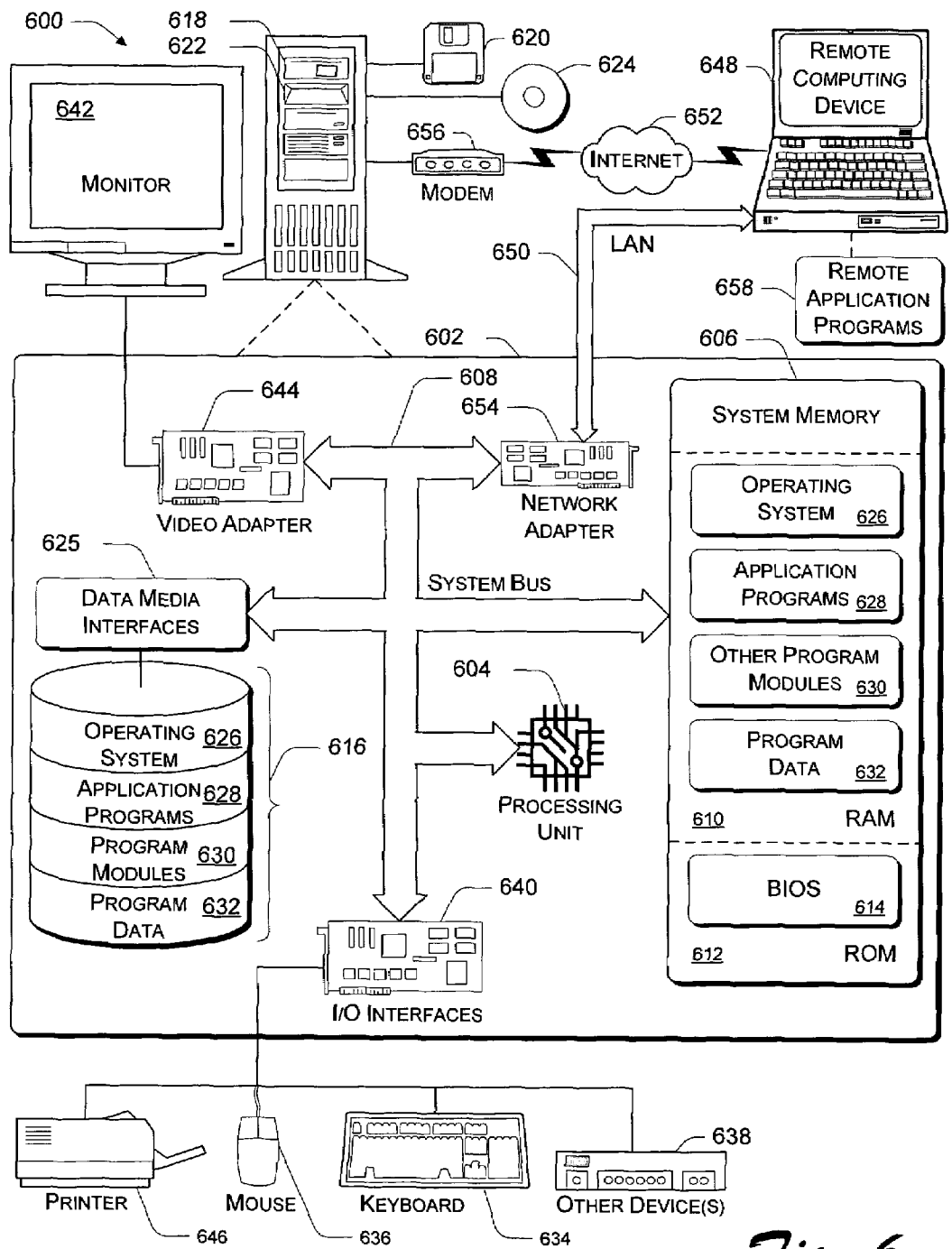
FIG. 6 illustrates a general computer environment, which can be used to implement the techniques described herein.

FIG. 6 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, a client 108 or server 102 of FIG. 1. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 660, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The systems and methods described herein provide a convenient way to incorporate click track and/or page view tracking into a web page by declarative means. As such, web page developers can utilize desirable functionality without having to provide unique click code for each link in a web page. This results in more uniform programming and reduces errors in page links.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, comprising:
   receiving a request from a client to view a web page that includes one or more selectable links;
   inspecting each of the one or more selectable links included with the requested web page to determine if the one or more selectable links contain a respective link identifier, the respective link identifier configured to designate a corresponding selectable link to be tracked via a tracking system;
   replacing each of the one or more selectable links identified as containing the respective link identifier with a modified link that contains a tracking identifier for use in the tracking system to track the corresponding selectable link;
   injecting client-side tracking code into the web page, the client-side tracking code being configured to run tracking procedures on the client when one of said modified links is selected to cause redirection to a corresponding location;
   communicating the web page having said modified links and the client-side tracking code so that the web page is viewable at the client;
   monitoring for a selection of one of said modified links; and
   when one of said modified links is selected to cause redirection to said corresponding location, communicating with the client to initiate the client-side tracking code to execute a tracking function that records information related to the corresponding selectable link in a log file.

2. The method as recited in claim 1, wherein the link identifier further comprises an area identifier that identifies an area on the web page in which the corresponding selectable link is located.

3. The method as recited in claim 1, wherein the link identifier further comprises a link type identifier that identifies a type of link of the corresponding selectable link.

4. The method as recited in claim 1, wherein the tracking identifier further comprises a container identifier that identifies a container in which the corresponding selectable link is located.

5. The method as recited in claim 4, wherein the tracking identifier further comprises a link index that is an index of the corresponding selectable link inside the container that is identified by the container identifier.

6. The method as recited in claim 1, further comprising the step of confirming that the web page loaded properly and is viewable at the client before proceeding with the tracking function.

7. The method as recited in claim 1, wherein the information related to the corresponding selectable link further comprises the web page on which the corresponding selectable link is located and an area of the web page in which the corresponding selectable link is located.

8. The method as recited in claim 1, further comprising terminating the processing of further steps for each of the one or more selectable links that does not include the respective link identifier.

9. A system, comprising:
a processor;
a memory coupled to the processor;
web content in the form of one or multiple web pages stored in the memory, one said web page containing a selectable link that includes a link identifier;
a tracking module stored in the memory and executable via the processor, the tracking module, when executed, configured to:
responsive to a request from a client to view the one said web page, replace the selectable link of the one said web page with a modified link that includes a tracking identifier in place of the link identifier of the selectable link;
inject client-side tracking code into the web page that contains the modified link; and
communicate the one said web page having the modified link and the client-side tracking code to the requesting client; and
call the client-side tracking code to execute and initiate a tracking event with a tracking system when the modified link is selected to cause redirection to a corresponding location.

10. The system as recited in claim 9, wherein the link identifier further comprises an area identifier that identifies an area of the web page on which the selectable link is located.

11. The system as recited in claim 9, wherein the link identifier further comprises a link type identifier that identifies a type of link of the selectable link.

12. The system as recited in claim 9, wherein the tracking module does not execute if the selectable link does not contain a link identifier.

13. The system as recited in claim 9, wherein the tracking identifier further comprises a container identifier that identifies a container in which the selectable link is located.

14. The system as recited in claim 9, wherein the tracking identifier further comprises the link identifier included in the selectable link.

15. The system as recited in claim 9, wherein the tracking identifier further comprises a modified link identifier that is different from the link identifier that is included in the selectable link.

16. The system as recited in claim 9, wherein the client-side tracking code is further configured to test a connection with the tracking system and skip the tracking event if the tracking system does not respond to the client within a specified timeout period.

17. The system as recited in claim 16, wherein the specified timeout period further comprises one and one-half seconds.

18. One or more computer-readable storage media containing computer-executable instructions that, when executed on a computer, perform the following steps:
replacing selectable tracking links in a web page requested by a client with modified selectable links that each include a tracking identifier for use with a tracking system to track a corresponding selectable tracking link;
injecting client-side code into the requested web page, the client-side code being configured to run at client to initiate a tracking event when one of said modified selectable links is clicked;
communicating the requested web page having the modified selectable links and the client-side code to the client;
initiating execution of the client-side code upon determining that one of said modified selectable links has been clicked at the client; and
providing tracking information to a tracking system configured to log information related to the one said modified selectable link and the selection thereof.

19. The one or more computer-readable storage media as recited in claim 18, wherein the selectable tracking links are identified by inclusion of a link identifier in each selectable tracking link.

20. The one or more computer-readable storage media as recited in claim 19, wherein the link identifier further comprises an area identifier that identifies an area of the web page in which a selectable tracking link that contains the link identifier is located.

21. The one or more computer-readable storage media as recited in claim 19, wherein the link identifier further comprises a link type identifier that identifies a type of link of a selectable tracking link that contains the link identifier.

22. The one or more computer-readable storage media as recited in claim 18 wherein the tracking identifier further comprises a container identifier that identifies a container that includes the corresponding selectable tracking link.

23. The one or more computer-readable storage media as recited in claim 22 wherein the tracking identifier further comprises an index that identifies a location of the corresponding selectable tracking link inside the container that is identified by the container identifier.

24. The one or more computer-readable storage media as recited in claim 18, wherein the tracking information further comprises information identifying the web page.

25. The one or more computer-readable storage media as recited in claim 18, wherein the tracking information further comprises information identifying a location of the corresponding selectable tracking link on the web page.

26. The one or more computer-readable storage media as recited in claim 18, wherein the tracking information further comprises page view information.

* * * * *

UNITED STATES PATENT AND TRADEMARK OFFICE
CERTIFICATE OF CORRECTION

Page 1 of 1

PATENT NO. : 7,409,422 B2
APPLICATION NO. : 10/645224
DATED : August 5, 2008
INVENTOR(S) : Brian S. Christian et al.

It is certified that error appears in the above-identified patent and that said Letters Patent is hereby corrected as shown below:

In Title page, in field (75), under "Inventors" column 1, line 2, delete "Devatta" and insert -- Devdatta --, therefor.

Signed and Sealed this
Fourteenth Day of June, 2011

David J. Kappos
*Director of the United States Patent and Trademark Office*